(12) United States Patent
Chu et al.

(10) Patent No.: US 10,723,644 B2
(45) Date of Patent: Jul. 28, 2020

(54) METHOD FOR CONTROLLING CHLORINATED NITROGEN-CONTAINING DISINFECTION BY-PRODUCT IN WATER

(71) Applicant: Tongji University, Shanghai (CN)

(72) Inventors: Wenhai Chu, Shanghai (CN); Dongmei Li, Shanghai (CN); Naiyun Gao, Shanghai (CN); Shunke Ding, Shanghai (CN); Chao Fang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 47 days.

(21) Appl. No.: 16/112,721

(22) Filed: Aug. 26, 2018

(65) Prior Publication Data
US 2019/0055148 A1 Feb. 21, 2019

Related U.S. Application Data

(63) Continuation of application No. PCT/CN2017/074505, filed on Feb. 23, 2017.

(30) Foreign Application Priority Data

Feb. 26, 2016 (CN) .......................... 2016 1 0107612

(51) Int. Cl.
*C02F 9/00* (2006.01)
*A01N 59/00* (2006.01)
(Continued)

(52) U.S. Cl.
CPC ................ *C02F 9/00* (2013.01); *A01N 59/00* (2013.01); *C02F 1/32* (2013.01); *C02F 1/66* (2013.01);
(Continued)

(58) Field of Classification Search
CPC .......... C02F 9/00; C02F 1/66; C02F 2303/04; C02F 1/76; C02F 1/74; C02F 2305/10;
(Continued)

(56) References Cited

U.S. PATENT DOCUMENTS

2018/0134592 A1* 5/2018 Szczesniak ............... C02F 1/20

FOREIGN PATENT DOCUMENTS

| CN | 102674603 A | 9/2012 |
| CN | 104150562 A | 11/2014 |

(Continued)

OTHER PUBLICATIONS

International Search Report, PCT/CN2017/074505, dated May 19, 2017, 5 pages.

*Primary Examiner* — Cameron J Allen
(74) *Attorney, Agent, or Firm* — Edell, Shapiro & Finnan, LLC

(57) ABSTRACT

Disclosed is a method for controlling a chlorinated nitrogen-containing disinfection by-product in water, including the following steps: firstly, the pH value of a water sample is controlled, ultraviolet irradiation treatment is used and a persulfate or hydrogen persulfate is added at the same time, then chlorination disinfection is carried out, and finally, aeration treatment is carried out, so that a water sample from which the chlorinated nitrogen-containing disinfection by-product in water is removed and obtained. The method can effectively control the formation of chlorinated N-DBPs, and can effectively reduce the amount of trichloromethane in the subsequent chlorination disinfection process.

14 Claims, 3 Drawing Sheets

(51) Int. Cl.
*C02F 1/66* (2006.01)
*C02F 1/76* (2006.01)
*C02F 1/74* (2006.01)
*C02F 1/32* (2006.01)

(52) U.S. Cl.
CPC .................. *C02F 1/74* (2013.01); *C02F 1/76* (2013.01); *C02F 2201/3221* (2013.01); *C02F 2303/04* (2013.01); *C02F 2303/18* (2013.01); *C02F 2305/02* (2013.01); *C02F 2305/10* (2013.01)

(58) Field of Classification Search
CPC .......... C02F 2201/3221; C02F 2305/02; C02F 2303/18; A01N 59/00; A01N 25/00
See application file for complete search history.

(56) References Cited

FOREIGN PATENT DOCUMENTS

| | | |
|---|---|---|
| CN | 104829008 A | 8/2015 |
| CN | 105668880 A | 6/2016 |
| JP | H0924379 A | 1/1997 |

\* cited by examiner

METHOD FOR CONTROLLING CHLORINATED NITROGEN-CONTAINING DISINFECTION BY-PRODUCT IN WATER

TECHNICAL FIELD

The invention belongs to a technical field of water treatment and relates to a method for controlling chlorinated nitrogen-containing disinfection by-products in water.

BACKGROUND

Drinking water safety is a major livelihood issue for thousands of households. Drinking water disinfection is an indispensable treatment for drinking water safety. The widely used chlorine disinfection process can effectively kill bacteria and viruses, but it also produces disinfection by-products (DBPs) that are harmful to human bodies. In the past forty years, carbon-containing disinfection by-products (C-DBPs) such as trichloromethane have been extensively studied and reported. However, due to the continuous growth of the world population, the rapid development of industry and agriculture, and the lack of awareness and management of environmental issues, the issue of eutrophication in global water bodies is becoming increasingly serious and China is no exception. If pollutant emissions exceed the environmental capacity of the receiving waters, the water quality of some water sources can deteriorate. The level of dissolved organic nitrogen (DON) in the water sources increases, and some DON compounds, like amino acids, etc., are so highly hydrophilic that these compounds cannot be removed by conventional water purification processes such as coagulation, sedimentation and filtration and thus react with the disinfectants (e.g., chlorine, etc.) added in subsequent disinfection processes to form nitrogen-containing disinfection by-products (N-DBPs). Studies show that the toxicity of N-DBPs is much higher than that of C-DBPs such as trichloromethane (TCM), and N-DBPs are ubiquitous in effluents after chlorine disinfection by water plants and are very unfavorable to the health of people who drink water. Therefore, N-DBPs have become one of international major research hotspots in the field of municipal administration, environment and public health nowadays.

The chlorinated N-DBPs that are currently receiving more attention include: haloacetonitriles (HANs), haloacetamides (HAcAms) and halonitromethanes (HNMs). They are often present in drinking water after chlorination disinfection (e.g., free chlorine, chloramine disinfection, etc.) at a level of μg/L. Studies show that their chronic cytotoxicity and acute genotoxicity are hundreds to thousands of times than that of THMs, thus seriously harming the health of people who drink water. The three types of halogenated N-DBPs like HANs, HNMs and HAcAms all include chlorinated, brominated and iodinated type, among which chlorinated N-DBPs have the highest concentration in drinking water after chlorination disinfection so that they are needed to be put much attention and kept in control. Chlorinated HANs include dichloroacetonitrile (DCAN) and trichloroacetonitrile (TCAN), chlorinated HAcAms include dichloroacetamide (DCAcAm) and trichloroacetamide (TCAcAm), and chlorinated HNMs include dichloronitromethane (DCNM) and trichloronitromethane (TCNM). The structures of chlorinated N-DBPs are as follows:

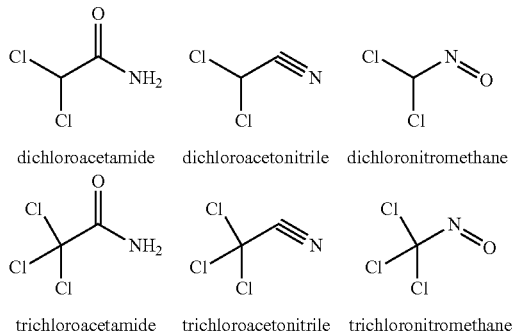

dichloroacetamide   dichloroacetonitrile   dichloronitromethane trichloroacetamide   trichloroacetonitrile   trichloronitromethane

SUMMARY OF THE INVENTION

In view of the problems of the prior art, the object of the present invention is to provide a method for controlling chlorinated nitrogen-containing disinfection by-products in water, which starts from the source control angle and utilizes highly oxidizing sulfate radicals to efficiently remove chlorinated precursors of N-DBPs. And the method introduces a rapid aeration measures to solve such problem that oxidation of sulfate radicals could result in increase of trichloromethane concentration in subsequent chlorination disinfection process, achieving the purpose of removing chlorinated N-DBPs and trichloromethane simultaneously. The method is low in cost, easy to implement, convenient to control and free from secondary pollution as compared with N-DBPs control technique producing the same effect, which improves the safety of drinking water and ensures the health of people drinking water.

In order to achieve the above object, the technical solutions adopted by the present invention are as follows:

A method for controlling chlorinated nitrogen-containing disinfection by-products in water comprises the following steps:

Firstly, control pH value of a water sample, irradiate the water sample with ultraviolet light, and simultaneously add persulfate or hydrogen persulfate into the water sample, then conduct chlorination disinfection, and finally perform aeration treatment to obtain a water sample from which chlorinated nitrogen-containing disinfection by-products are removed.

The water sample is drinking water.

The pH value is 6 to 10, and the pH value is controlled by at least one of the group consisting of a concentrated sulfuric acid, sodium hydroxide, and phosphate buffer solution.

The ultraviolet light has a wavelength of 180 to 290 nm with an irradiation dose of 15 to 600 mJ/cm$^2$, and the irradiation time of the ultraviolet light is 1 to 30 minutes. The ultraviolet light is provided by at least one of the group consisting of a low pressure mercury lamp, a medium pressure mercury lamp, a high pressure mercury lamp, a xenon lamp and a halogen lamp. The ultraviolet lamp is arranged in a suspended irradiation manner, and the distance between the ultraviolet lamp and the water sample is not more than 100 cm.

The persulfate is selected from at least one of the group consisting of sodium persulfate, potassium persulfate, and ammonium persulfate.

The hydrogen persulfate is selected from at least one of the group consisting of potassium hydrogen persulfate, sodium hydrogen persulfate, and ammonium hydrogen persulfate.

The persulfate or hydrogen persulfate is added in an amount of 10 to 200 mg/L.

The chlorination disinfection is performed by adding a hypochlorite solution or liquid chlorine. Preferably, the hypochlorite is sodium hypochlorite.

The concentration of available chlorine in the chlorination disinfection is 5 to 30 mg/L.

The chlorination disinfection terminates by adding a dechlorination reagent so as to end the chlorination reaction. The dechlorination reagent is preferably selected from at least one of the group consisting of ascorbic acid, sodium sulfite, and sodium thiosulfate.

The flow rate of the aeration treatment is 2 to 60 L/h, and the aeration time is 1 to 10 minutes.

The aeration device used in the aeration treatment is a small air pump that blows air flow for aeration, and the aeration gas source is air.

Due to the adoption of the above technical solutions, the present invention has the following advantages and beneficial effects:

This application solves the problem of disinfection by-products in drinking water from the angle of source control. At present, the control method of N-DBPs can be summarized into three aspects:

(1) Source control: the precursor substance of N-DBPs in water is removed before disinfection so that the disinfectant (e.g., chlorine and chloramine, etc.) added during disinfection process cannot react with the precursor substance to form N-DBPs.

(2) Process control: the process control can reduce the formation of N-DBPs in the disinfection process mainly by changing the disinfection process parameters or disinfection methods. Changing the disinfection process parameters means that the formation of N-DBPs can be reduced by reducing the parameters such as the amount of disinfectant used on the basis of ensuring the disinfection and sterilization effect. Changing the disinfection method means replacing the existing disinfection process or adding a new disinfection process based on the existing disinfection process.

(3). End Control: the end control refers to removal of already formed N-DBPs.

The N-DBPs such as already formed chlorinated HANs and HAcAms can be controlled from the end control angle, which can effectively reduce their concentration to some extent, but their re-formation cannot be inhibited in the presence of precursors and residual chlorine. Therefore, end control may be only a cure for symptoms but not for essences.

For process control, some studies have investigated the effects of such factors as different disinfection doses, reaction time and solution pH value on process control of chlorinated N-DBPs. Under certain disinfection conditions and methods, the formation of certain N-DBPs can be kept in control, which at the same time also lead to the generation of another type of N-DBPs.

Therefore, prior to the disinfection and in combination with the actual situation of the water plant, it is an effective N-DBPs control method to efficiently remove the N-DBPs precursors by newly adding pretreatment measures, thereby achieving the source control towards chlorinated N-DBPs. The present application removes chlorinated N-DBPs precursors through highly oxidizing sulfate radicals produced by activation of persulfate (e.g., sodium persulfate) via ultraviolet radiation. Sulfate radicals produced by UV irradiation of persulfate have high oxidation potential and can efficiently oxidize and then remove chlorinated N-DBPs precursors, thereby inhibiting the formation of chlorinated N-DBPs during subsequent chlorination disinfection process.

The present application is directed to the problem that the oxidation of the sulfate radicals may lead to an increase in the concentration of the trichloromethane in the subsequent chlorination disinfection and a rapid aeration process is newly added so as to achieve the purpose of simultaneously removing the chlorinated N-DBPs and the trichloromethane. The high oxidative nature of sulfate radicals may destroy the structure of dissolved organic matter in the water body, which in turn leads to an increase in the concentration of trichloromethane during subsequent chlorination disinfection. Due to the strong volatility of trichloromethane, the concentration of trichloromethane in the water body can be reduced by a rapid aeration process, thereby achieving the purpose of simultaneous removal of chlorinated N-DBPs and trichloromethane. The method of the present application has little demand for high ultraviolet light and does not incur high energy costs; the chemical used is cheap in price and does not affect the sense of water quality. The aeration device is simple in structure and easy to use. It uses the air flow as source, which is economical and applicable to different situations. The reactor used is simple in design and convenient to use, which can effectively control the formation of chlorinated N-DBP and then effectively reduce the amount of trichloromethane in the subsequent chlorination disinfection process. Therefore, it is a safe, high efficient and economical method for controlling the chlorinated nitrogen-containing disinfection by-products in drinking water.

DETAILED DESCRIPTION

Figure 1:
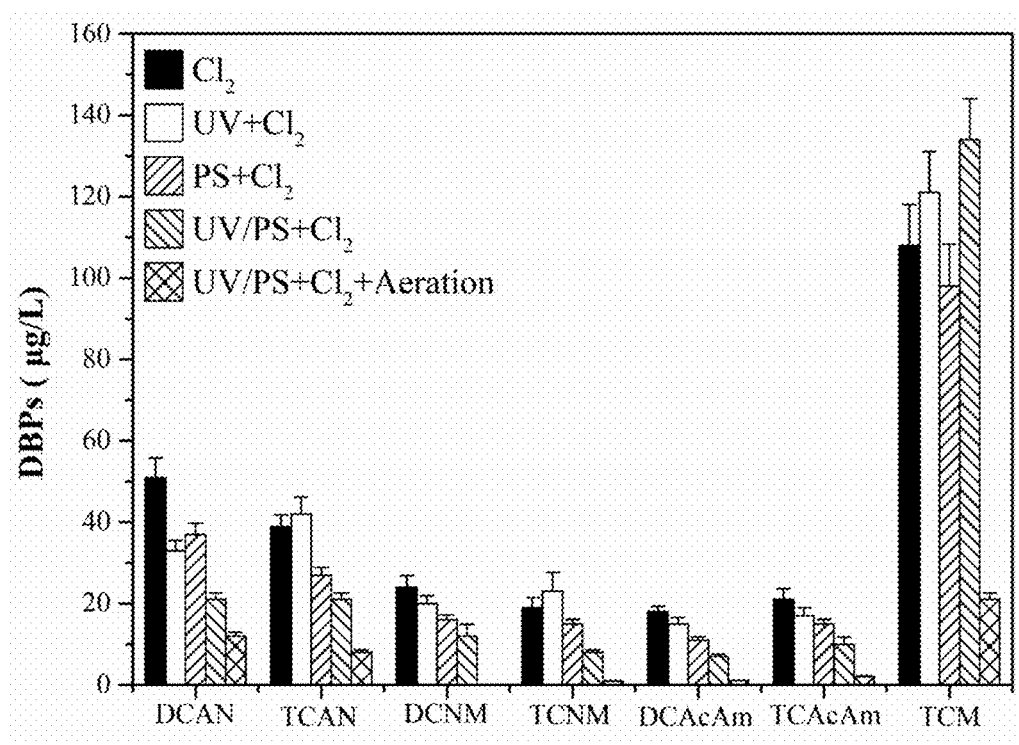
FIG. 1 is an illustrative diagram showing the results of the method for controlling chlorinated nitrogen-containing disinfection by-products in water according to example 1 of the present invention.

The present invention will be further described in detail as follows with reference to the examples shown in the drawings.

Example 1

Figure 4:
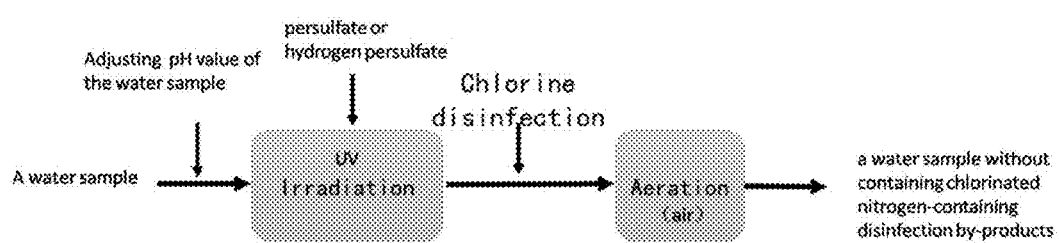
FIG. 4 is a process flow diagram of the method for controlling chlorinated nitrogen-containing disinfection by-products in water according to example 1 of the present invention.

A method for controlling chlorinated nitrogen-containing disinfection by-products in drinking water (as shown in FIG. 4. FIG. 4 is a process flow diagram of a method for controlling chlorinated nitrogen-containing disinfection by-products in water according to example 1 of the present invention). The method is performed in the following steps: the pH value of an actual water body having initial dissolved organic nitrogen at a concentration of about 0.5 mg/L is controlled to 6, and the pH value is adjusted by a concentrated sulfuric acid solution. The actual water body is irradiated by an ultraviolet light having a wavelength of 180 nm that is produced by a low-pressure mercury lamp, and the irradiation dosage of the ultraviolet light is 500 mJ/cm², the irradiation time is 1 min. The ultraviolet lamp is arranged in a suspended irradiation manner, and the distance between the ultraviolet lamp and the water body is not more than 100 cm, and the power of the ultraviolet lamp is 15 W; and at the same time, sodium persulfate is added to the water body at a dosage of 200 mg/L. The ultraviolet light excites sodium persulfate to produce highly oxidizing sulfate radicals so as to oxidize and then remove the precursor of chlorinated N-DBPs, thereby inhibiting the formation of chlorinated N-DBPs in the subsequent chlorination disinfection process; and then chlorination disinfection is performed, during which the water sample is transferred to a 40 mL brown ampule bottle and is added 9.1 mg/L of available chlorine, that is, a NaClO solution (when in use, being diluted to a mother solution having an available chlorine content of about 10 g/L and placed in a brown reagent bottle and then stored in the dark at 4° C.). After the chlorine is added, the brown ampule bottle is immediately sealed with a screw cap having a Teflon gasket. After thorough mixing, it is stored in an incubator for 24 hours and kept at a temperature of 24±1° C. After the end of the 24 h reaction, 1.6 mg/L of ascorbic acid is added to terminate the chlorination reaction, and the chlorination disinfection is completed. Aeration is then carried out to remove possible newly-generated volatile disinfection by-products such as trichloromethane. The aeration device uses a small air pump to blow air flow for aeration. The aeration gas source is air, the aeration flow rate is 60 L/h, and the aeration time is 5 minutes. Determination method of disinfection by-products is as follows: firstly, the water sample after aeration is subjected to liquid-liquid extraction operation, the water sample is passed through a 0.45 μm microporous membrane, and ascorbic acid is added to the water sample to eliminate residual chlorine in the water (the amount of ascorbic acid added [in molar concentration] is 2 to 3 times than that of residual chlorine in water), and then 4 g of anhydrous sodium sulfate is added to a test tube containing 20 mL of water sample. The test tube is shaken on a test tube shaker for 1 min to make anhydrous sodium sulfate fully dissolved until the water level rises. Then add 2 mL of extractant ethyl acetate into the test tube, and shake it on a test tube shaker for 3 min and let it stand still for 10 min. Use a pipette to take 1 mL of the upper extractant solution into a 1.5 mL sample bottle, and place the sample bottle in AOC-20i autosampler to wait determination by gas chromatography mass spectrometry (GC/MS) (Shimazu GC/MS-QP2010S, Japan). The instrument setup conditions are as follows: RTX-5MS capillary column (column length 30 m, inner diameter 0.25 mm, 0.25 μm film thickness), AOC-20i autosampler. Detection conditions are as follows: the carrier gas is high-purity helium gas; the carrier gas flow control mode is pressure control; the carrier gas flow rate is 56.9 mL/min; the injection volume is 1.04 μL; the injection mode is splitless; the inlet temperature is 180° C.; mass spectrometer temperature is 250° C.; ion source is electronic impact ion source (EI); electron energy is 70 eV; scanning mass range m/z is 20~200; detection mode is selective ion monitoring (SIM). Temperature program: the initial temperature is 40° C. and is held for 10 minutes, and then ramping to 150° C. at a rate of 40° C./min, and holding for 5 minutes.

The experimental results are shown in FIG. 1. FIG. 1 is an illustrative diagram showing the results of the method for controlling chlorinated nitrogen-containing disinfection by-products in water according to example 1 of the present invention. Re-disinfection after UV and persulfate treatment can well inhibit the formation of chlorinated nitrogen-containing disinfection by-products in water; The production of dichloroacetonitrile, trichloroacetonitrile, dichloronitromethane, trichloronitromethane, dichloroacetamide and trichloroacetamide was reduced by 59%, 46%, 50%, 58%, 61%, and 52%, respectively; after micro-aeration treatment, removal effect of the produced trichloromethane (TCM) is also good. The removal rate reached 90%. (PS described in FIG. 1 refers to persulfate).

The specific aeration method, aeration amount and aeration time of the present invention can be determined according to a combination of the factors including the amount of treated water, the concentration of volatile disinfection by-products, and economic conditions. The specific ultraviolet light irradiation time or the light irradiation dose and the persulfate dosage of the present invention may be determined on the basis of the comprehensive characteristics of the actual water body's characteristics (soluble organic nitrogen concentration, turbidity and color), light source characteristics (irradiation light intensity, light depth). The disinfecting reagent dose and the disinfecting time of the present invention can be determined based on comprehensive factors such as the characteristics of the actual water body (dissolved organic carbon concentration, dissolved organic nitrogen concentration, and halogen ion concentration).

The method of the present application does not have high demand towards ultraviolet light and does not incur high energy costs; the chemical used is cheap in price, and does not affect the sense of water quality; the aeration device is simple in structure and easy to use, and it uses air as airflow source, which is economical and applicable to different situations. The reactor used is simple in design and convenient to use so as to be able to effectively control the formation of chlorinated N-DBPs, and can effectively reduce the amount of trichloromethane in the subsequent chlorination process. Therefore, it is a safe, high efficient and economical method for controlling chlorinated nitrogen-containing disinfection by-products in drinking water.

In the ultraviolet persulfate oxidation system of the present invention, there are mainly three ways to remove the precursor of the chlorinated N-DBPs: one way is conducting photolysis by using the ability of the precursor to absorb ultraviolet light in the ultraviolet spectral range; another way is directly oxidizing and then removing the precursor of the chlorinated N-DBPs by utilizing the oxidizing property of persulfate; the third way is using ultraviolet light to excite the persulfate to generate sulfate radicals, as shown below:

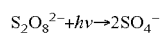

Oxidative removal of precursors of chlorinated N-DBPs in water body can inhibit the formation of chlorinated N-DBPs from the source, as shown below:

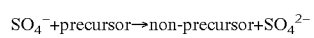

In the present invention, the dosage of persulfate and ultraviolet irradiation, and amount of aeration should be reasonably adjusted according to these factors including the background substance in the water body, such as suspended matter, humus, total bacteria, dissolved organic nitrogen (DON), pH value, etc. The turbidity and chromaticity of the water body have certain influence on the ultraviolet light irradiation. The absorbance of the actual water body under ultraviolet light can be measured, and then the reactor can be reasonably designed according to the Lambert Beer's law to satisfy the needs of designed ultraviolet light dose (that is, 15 to 500 mJ/cm$^2$).

Example 2

A method for controlling chlorinated nitrogen-containing disinfection by-products in drinking water is achieved by the following steps: the pH value of the water body is adjusted to 7, which contains 0.615 mg/L chloramphenicol (belonging to dissolved organic nitrogen, equivalent to a dissolved organic nitrogen at a concentration of 0.05 mg/L), and the pH value is adjusted with a phosphate buffer solution. The volume of the water body is 40 mL, and then the water body is irradiated with a medium-pressure mercury lamp at a wavelength of 270 nm, and the irradiation dose of ultraviolet light was 585 mJ/cm$^2$. The irradiation time is 15 min. The UV lamp is arranged as a suspending and parallel irradiation reactor. The distance between the UV lamp and the water body is not more than 100 cm, and the power of the UV lamp is 15 W. When in irradiation, the sodium persulfate is added at a concentration of 78 mg/L, that is, degradation of nitrogen-containing disinfection by-product precursors is completed, thereby inhibiting the formation of chlorinated N-DBPs during subsequent chlorination disinfection. Then chlorination disinfection is performed, during which the water body is transferred to a 40 mL brown ampule bottle with an addition of 5.1 mg/L of effective chlorine, that is, NaClO solution (when in use, being diluted to a mother solution having an available chlorine content of about 10 g/L and placed in a brown reagent bottle and then stored in the dark at 4° C.), after which the brown ampule bottle is immediately sealed with a screw cap having a Teflon gasket. After thorough mixing, it is stored in an incubator for 24 hours and kept at a temperature of 24±1° C. After the end of the reaction for 24 hours, 1.0 mg/L of ascorbic acid is added to terminate the chlorination reaction. Aeration is then carried out to remove possible newly-generated highly volatile disinfection by-products such as trichloromethane. The aeration device uses a small air pump to blow air flow for aeration. The aeration gas sources from air, the air flow rate for aeration is 40 L/h, and the aeration time is 10 minutes.

Determination method of disinfection by-products is as follows: firstly, the water sample after aeration is subjected to liquid-liquid extraction operation; the water sample is passed through a 0.45 μm microporous membrane, and ascorbic acid is added to the water sample to eliminate residual chlorine in it (the amount of ascorbic acid added [in molar concentration] is 2 to 3 times than that of residual chlorine in water), and then 4 g of anhydrous sodium sulfate is added to a test tube containing 20 mL of a water sample. The test tube is then shaken on a test tube shaker for 1 minute to make anhydrous sodium sulfate fully dissolved until the water level rises to some extent. Then add 2 mL of extractant ethyl acetate into the test tube, and shake it on a test tube shaker for 3 minutes and let it stand still for 10 min. Use a pipette to take 1 mL of the upper extractant solution into a 1.5 mL sample bottle, and place the sample bottle in AOC-20i autosampler to wait determination by gas chromatography mass spectrometry (GC/MS) (Shimazu GC/MS-QP2010S, Japan). The instrument setup conditions are as follows: RTX-5MS capillary column (column length 30 m, inner diameter 0.25 mm, 0.25 μm film thickness), AOC-20i autosampler. Detection conditions are as follows: the carrier gas is high-purity helium gas; the carrier gas flow control mode is pressure control; flow rate of the carrier gas is 56.9 mL/min; the injection volume is 1.04 μL; the injection mode is splitless; the inlet temperature is 180° C.; mass spectrometer temperature is 250° C.; ion source is electronic impact ion source (EI); electron energy is 70 eV; scanning mass range m/z is 20~200; detection mode is selective ion monitoring (SIM). Temperature program: the initial temperature is 40° C., and held for 10 minutes, and then ramping to 150° C. at a rate of 40° C./min, and holding for 5 min.

Figure 2:
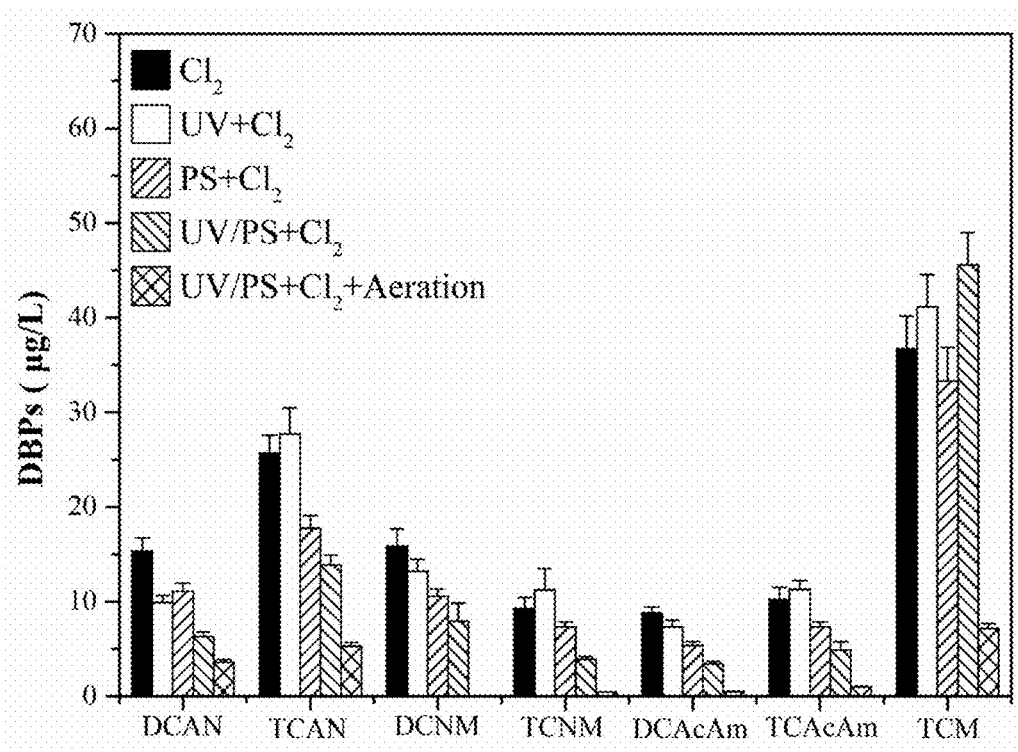
FIG. 2 is an illustrative diagram showing the results of the method for controlling chlorinated nitrogen-containing disinfection by-products in water according to example 2 of the present invention.

The experimental results are shown in FIG. 2. FIG. 2 is an illustrative diagram showing the results of the method for controlling chlorinated nitrogen-containing disinfection by-products in water according to example 2 of the present invention. Re-disinfection after UV and persulfate treatment can well inhibit the formation of chlorinated nitrogen-containing disinfection by-products in water; The production of dichloroacetonitrile, trichloroacetonitrile, dichloronitromethane, trichloronitromethane, dichloroacetamide and trichloroacetamide was reduced by 58%, 46%, 49%, 58%, 63%, and 42%, respectively; after micro-aeration treatment, removal effect of the produced trichloromethane (TCM) is also great. The removal rate reaches 82%.

Example 3

A method for controlling chlorinated nitrogen-containing disinfection by-products in drinking water is achieved by the following steps: the pH value of the actual water body is adjusted to 9, which contains 0.5 mg/L initial dissolved organic nitrogen, and the pH value is adjusted with a NaOH solution. The volume of the drinking water body is 40 mL, and then the drinking water body is irradiated with a high-pressure mercury lamp at a wavelength of 290 nm, and the irradiation dose of ultraviolet light is 585 mJ/cm$^2$. The irradiation time is 30 minutes. The UV lamp is arranged as a suspending and parallel irradiation reactor. The distance between the UV lamp and the water body is not more than 100 cm, and the power of the UV lamp is 15 W. When in irradiation, the sodium persulfate is added at a concentration of 119 mg/L, that is, degradation of chlorinated nitrogen-containing disinfection by-product precursors is completed, thereby inhibiting the formation of chlorinated N-DBPs during subsequent chlorination disinfection. Then chlorination disinfection is performed, during which the water body to be tested was transferred to a 40 mL brown ampule bottle, adding 7.1 mg/L of effective chlorine, that is, NaClO solution (when in use, being diluted to a mother solution having an available chlorine content of about 10 g/L and placed in a brown reagent bottle and then stored in the dark at 4° C.). After the chlorine is added, the brown ampule bottle is immediately sealed with a screw cap having a Teflon gasket. After thorough mixing, it is stored in an incubator for 24 hours and kept at a temperature of 24±1° C. After the end of the 24 hours' reaction, 1.4 mg/L of ascorbic acid is added to terminate the chlorination reaction. Micro-aeration is then carried out. The aeration device uses a small air pump to blow air flow for aeration. The aeration gas sources from air, the aeration flow rate is 50 L/h, and the aeration time is 10 minutes so as to remove newly-generated volatile disinfection by-products.

Determination method of disinfection by-products is as follows: firstly, the water sample after aeration is subjected to liquid-liquid extraction operation; the water sample is passed through a 0.45 μm microporous membrane, and ascorbic acid is added to the water sample to eliminate residual chlorine in the water (the amount of ascorbic acid added [in molar concentration] is 2 to 3 times than that of residual chlorine in water), and then 4 g of anhydrous sodium sulfate is added to a test tube containing 20 mL of water sample. The test tube is shaken on a test tube shaker for 1 min to make anhydrous sodium sulfate fully dissolved until the water level rises. Then add 2 mL of extractant ethyl acetate into the test tube, and shake it on a test tube shaker for 3 min and let it stand still for 10 min. Use a pipette to take 1 mL of the upper extractant solution into a 1.5 mL sample bottle, and place the sample bottle in AOC-20i autosampler to wait determination by gas chromatography mass spectrometry (GC/MS) (Shimazu GC/MS-QP2010S, Japan). The instrument setup conditions are as follows: RTX-5MS capillary column (column length 30 m, inner diameter 0.25 mm, 0.25 μm film thickness), AOC-20i autosampler. Detection conditions are as follows: the carrier gas is high-purity helium gas; the carrier gas flow control mode is pressure control; the carrier gas flow rate is 56.9 mL/min; the injection volume is 1.0 μL; the injection mode is splitless; the inlet temperature is 180° C.; mass spectrometer temperature is 250° C.; ion source is electronic impact ion source (EI); electron energy is 70 eV; scanning mass range m/z is 20~200; detection mode is selective ion monitoring (SIM). Temperature program: the initial temperature is 40° C., and held for 10 min, and then ramping to 150° C. at a rate of 40° C./min, and holding for 5 minutes.

Figure 3:
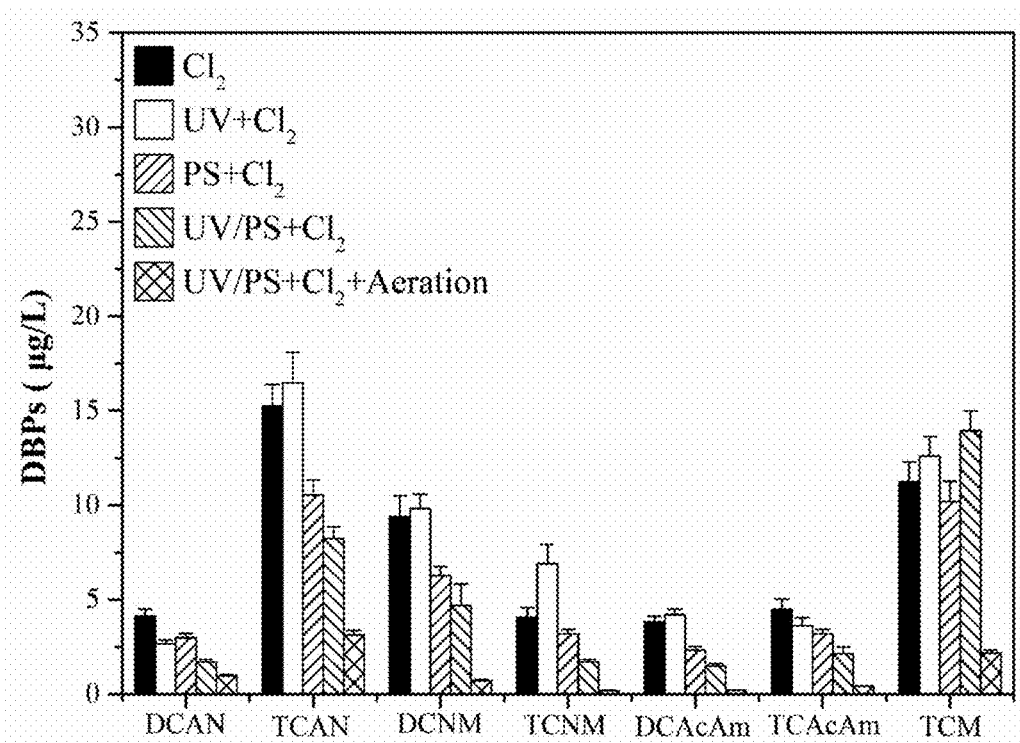
FIG. 3 is an illustrative diagram showing the results of the method for controlling chlorinated nitrogen-containing disinfection by-products in water according to example 3 of the present invention.

The experimental results are shown in FIG. 3. FIG. 3 is an illustrative diagram showing the results of the method for controlling chlorinated nitrogen-containing disinfection by-products in water according to example 3 of the present invention. Re-disinfection after UV and persulfate treatment can well inhibit the formation of chlorinated nitrogen-containing disinfection by-products in water; The production of dichloroacetonitrile, trichloroacetonitrile, dichloronitromethane, trichloronitromethane, dichloroacetamide and trichloroacetamide was reduced by 53%, 42%, 53%, 60%, 64%, and 55%, respectively; after micro-aeration treatment, removal effect of the produced trichloromethane is also great. The removal rate reaches 81%.

Example 4

A method for controlling chlorinated nitrogen-containing disinfection by-products in drinking water is achieved by the following steps: the pH value of the actual water body is adjusted to 10, which contains 0.5 mg/L initial dissolved organic nitrogen, and the pH value is adjusted with a NaOH solution. The volume of the drinking water body is 40 mL, and then the drinking water body is irradiated with a xenon UV lamp at a wavelength of 225 nm, and the irradiation dose of ultraviolet light was 15 mJ/cm². The irradiation time is 30 minutes. The UV lamp is arranged as a suspending and parallel irradiation reactor. The distance between the UV lamp and the water body is not more than 100 cm, and the power of the UV lamp is 15 W. When in irradiation, the potassium persulfate is added at a concentration of 10 mg/L, that is, degradation of chlorinated nitrogen-containing disinfection by-product precursors is completed, thereby inhibiting the formation of chlorinated N-DBPs during subsequent chlorination disinfection. Then chlorination disinfection is performed, during which the water body to be tested is transferred to a 40 mL brown ampule bottle with an addition of 30 mg/L of effective chlorine, that is, NaClO solution (when in use, being diluted to a mother solution having an available chlorine content of about 10 g/L and placed in a brown reagent bottle and then stored in the dark at 4° C.). After the available chlorine is added, the brown ampule bottle is immediately sealed with a screw cap having a Teflon gasket. After thorough mixing, it is stored in an incubator for 24 hours and kept at a temperature of 24±1° C. After the end of the 24 hour' reaction, 1.4 mg/L of sodium sulfite is added to terminate the chlorination reaction. Micro-aeration of the water sample is then carried out. The aeration device uses a small air pump to blow air flow for aeration. The aeration gas sources from air, the aeration flow rate is 2 L/h, and the aeration time is 10 minutes so as to remove newly-generated volatile disinfection by-products.

Determination method of disinfection by-products is as follows: firstly, the water sample after aeration is subjected to liquid-liquid extraction operation; the water sample is passed through a 0.45 μm microporous membrane, and ascorbic acid is added to the water sample to eliminate residual chlorine in the water (the amount of ascorbic acid added [in molar concentration] is 2 to 3 times than that of residual chlorine in water), and then 4 g of anhydrous sodium sulfate is added to a test tube containing 20 mL of water sample. The test tube is shaken on a test tube shaker for 1 minute to make anhydrous sodium sulfate fully dissolved until the water level rises. Then add 2 mL of extractant ethyl acetate into the test tube, and shake it on a test tube shaker for 3 minutes and let it stand still for 10 minutes. Use a pipette to take 1 mL of the upper extractant solution into a 1.5 mL sample bottle, and place the sample bottle in AOC-20i autosampler to wait determination by gas chromatography mass spectrometry (GC/MS) (Shimazu GC/MS-QP2010S, Japan). The instrument setup conditions are as follows: RTX-5MS capillary column (column length 30 m, inner diameter 0.25 mm, 0.25 μm film thickness), AOC-20i autosampler. Detection conditions are as follows: the carrier gas is high-purity helium gas; the carrier gas flow control mode is pressure control; the carrier gas flow rate is 56.9 mL/min; the injection volume is 1.0 μL; the injection mode is splitless; the inlet temperature is 180° C.; mass spectrometer temperature is 250° C.; ion source is electronic impact ion source (EI); electron energy is 70 eV; scanning mass range m/z is 20 to 200; detection mode is selective ion monitoring (SIM). Temperature program: the initial temperature is 40° C., and held for 10 minutes, and then ramping to 150° C. at a rate of 40° C./min, and holding for 5 minutes.

Re-disinfection after UV and persulfate treatment can well inhibit the formation of chlorinated nitrogen-containing disinfection by-products in water; The production of dichloroacetonitrile, trichloroacetonitrile, dichloronitromethane, trichloronitromethane, dichloroacetamide and trichloroacetamide was reduced by 39%, 28%, 30%, 33%, 41%, and 30%, respectively; after micro-aeration treatment, removal effect of the produced trichloromethane is also great. The removal rate reaches 63%.

Example 5

A method for controlling chlorinated nitrogen-containing disinfection by-products in drinking water is achieved by the following steps: the pH value of the actual water body is adjusted to 8, which contains 0.5 mg/L initial dissolved organic nitrogen, and the pH value is adjusted with a NaOH solution. The volume of the water body is 40 mL, and then the water body is irradiated with a halogen UV lamp at a wavelength of 250 nm, and the irradiation dose of ultraviolet light was 300 mJ/cm². The irradiation time is 30 min. The UV lamp is arranged as a suspending and parallel irradiation reactor. The distance between the UV lamp and the water body is not more than 100 cm, and the power of the UV lamp is 15 W. When in irradiation, the sodium hydrogen persulfate is added at a concentration of 150 mg/L, that is, degradation of chlorinated nitrogen-containing disinfection by-product precursors is completed, thereby inhibiting the formation of chlorinated N-DBPs during subsequent chlorination disinfection. Then chlorination disinfection is performed, during which the water body was transferred to a 40 mL brown ampule bottle, adding 17 mg/L of effective chlorine, that is, NaClO solution (when in use, being diluted to a mother solution having an available chlorine content of about 10 g/L and placed in a brown reagent bottle and then stored in the dark at 4° C.). After the chlorine is added, the brown ampule bottle is immediately sealed with a screw cap having a Teflon gasket. After thorough mixing, it is stored in an incubator for 24 hours and kept at a temperature of 24±1° C. After the end of the 24 hours' reaction, 1.0 mg/L of sodium thiosulfate is added to terminate the chlorination reaction. Aeration of the water sample is then carried out to remove possible newly-generated volatile disinfection by-products such as trichloromethane. The aeration device uses a small air pump to blow air flow for aeration. The aeration gas sources from air, the aeration flow rate is 30 L/h, and the aeration time is 5 minutes.

Determination method of disinfection by-products is as follows: firstly, the water sample after aeration is subjected to liquid-liquid extraction operation; the water sample is passed through a 0.45 μm microporous membrane, and ascorbic acid is added to the water sample to eliminate residual chlorine in the water (the amount of ascorbic acid added [in molar concentration] is 2 to 3 times than that of residual chlorine in water), and then 4 g of anhydrous sodium sulfate is added to a test tube containing 20 mL of water sample. The test tube is shaken on a test tube shaker for 1 minute to make anhydrous sodium sulfate fully dissolved until the water level rises. Then add 2 mL of extractant ethyl acetate into the test tube, and shake it on a test tube shaker for 3 minutes and let it stand still for 10 minutes. Use a pipette to take 1 mL of the upper extractant solution into a 1.5 mL sample bottle, and place the sample bottle in AOC-20i autosampler to wait determination by gas chromatography mass spectrometry (GC/MS) (Shimazu GC/MS-QP2010S, Japan). The instrument setup conditions are as follows: RTX-5MS capillary column (column length 30 m, inner diameter 0.25 mm, 0.25 μm film thickness), AOC-20i autosampler. Detection conditions are as follows: the carrier gas is high-purity helium gas; the carrier gas flow control mode is pressure control; the carrier gas flow rate is 56.9 mL/min; the injection volume is 1.04 μL; the injection mode is splitless; the inlet temperature is 180° C.; mass spectrometer temperature is 250° C.; ion source is electronic impact ion source (EI); electron energy is 70 eV; scanning mass range m/z is 20 to 200; detection mode is selective ion monitoring (SIM). Temperature program: the initial temperature is 40° C., and held for 10 min, and then ramping to 150° C. at a rate of 40° C./min, and holding for 5 minutes.

Re-disinfection after UV and persulfate treatment can well inhibit the formation of chlorinated nitrogen-containing disinfection by-products in water; The production of dichloroacetonitrile, trichloroacetonitrile, dichloronitromethane, trichloronitromethane, dichloroacetamide and trichloroacetamide was reduced by 43%, 37%, 38%, 41%, 49%, and 34%, respectively; after micro-aeration treatment, removal effect of the produced trichloromethane is also good. The removal rate reaches 65%.

The above description of the examples is intended to facilitate the understanding and application of the present invention by the persons skilled in the art. It will be apparent to those skilled in the art that various modifications may be made to these examples and the general principles described herein may be applied to other examples without any inventive work. Therefore, the present invention is not limited to the examples herein, and any improvement and modifications without going beyond the scope of the invention made by those skilled in the art according to the disclosure of the invention shall lie in the protection scope of the present invention.

We claim:

1. A method for controlling chlorinated nitrogen-containing disinfection by-products in water, comprising the following steps of:
   controlling pH value of a water sample;
   irradiating the water sample with ultraviolet light, and simultaneously adding persulfate or hydrogen persulfate into the water sample;
   conducting chlorination disinfection of the irradiated water sample; and
   performing aeration treatment to obtain a water sample from which the chlorinated nitrogen-containing disinfection by-products are removed.

2. The method of claim 1, wherein the water sample is drinking water.

3. The method of claim 1, wherein the pH value is 6-10, and pH value is controlled by at least one of the group consisting of a concentrated sulfuric acid, sodium hydroxide, and phosphate buffer solution.

4. The method of claim 1, wherein:
   the ultraviolet light has a wavelength of 180 to 290 nm, an irradiation dose of 15 to 600 mJ/cm$^2$, and an irradiation time of 1 to 30 minutes;
   the ultraviolet light is provided by at least one of the group consisting of a low pressure mercury lamp, a medium pressure mercury lamp, a high pressure mercury lamp, a xenon lamp and a halogen lamp; and
   a distance between the ultraviolet light and the water sample is not more than 100 cm.

5. The method of claim 1, wherein the persulfate is selected from at least one of the group consisting of sodium persulfate, potassium persulfate, and ammonium persulfate.

6. The method of claim 5, wherein the persulfate or hydrogen persulfate is added in an amount of 10 to 200 mg/L.

7. The method of claim 1, wherein the chlorination disinfection is performed by adding a hypochlorite solution or liquid chlorine.

8. The method of claim 7, wherein the concentration of available chlorine in the chlorination disinfection is 5 to 30 mg/L.

9. The method of claim 1, wherein the chlorination disinfection terminates by adding a dechlorination reagent to end the chlorination reaction.

10. The method of claim 1, wherein the flow rate of the aeration treatment is 2 to 60 L/h, and the aeration time is 1 minute to 10 minutes.

11. The method of claim 1, wherein the hydrogen persulfate is selected from at least one of the group consisting of potassium hydrogen persulfate, sodium hydrogen persulfate, and ammonium hydrogen persulfate.

12. The method of claim 7, wherein the hypochlorite solution comprises sodium hypochlorite.

13. The method of claim 9, wherein the dechlorination reagent is selected from at least one of the group consisting of ascorbic acid, sodium sulfite, and sodium thiosulfate.

14. The method of claim 10, wherein an aeration device used in the aeration treatment is a small air pump that blows air for aeration, and a gas source used for the aeration treatment is air.

* * * * *